(12) United States Patent
Woller et al.

(10) Patent No.: US 7,099,761 B2
(45) Date of Patent: Aug. 29, 2006

(54) METHOD AND DEVICE FOR DETERMINING A POSITION OF A PART OF A MOTOR VEHICLE SEAT WHICH CAN BE DISPLACED BY MEANS OF A DRIVE DEVICE

(75) Inventors: Alexander Woller, Kürnach (DE); Ingo Carl, Gochsheim (DE); Klaus Beloch, Michelau (DE)

(73) Assignee: Brose Fahrzeugteile GmnH & Co KG, Coburg, Coburg (DE)

( * ) Notice: Subject to any disclaimer, the term of this patent is extended or adjusted under 35 U.S.C. 154(b) by 246 days.

(21) Appl. No.: 10/477,011

(22) PCT Filed: May 6, 2002

(86) PCT No.: PCT/DE02/01683
§ 371 (c)(1),
(2), (4) Date: Nov. 7, 2003

(87) PCT Pub. No.: WO02/090139
PCT Pub. Date: Nov. 14, 2002

(65) Prior Publication Data
US 2004/0158378 A1 Aug. 12, 2004

(30) Foreign Application Priority Data
May 10, 2001 (DE) ................. 101 22 586

(51) Int. Cl.
*B60R 22/00* (2006.01)
(52) U.S. Cl. .............. 701/49; 701/45; 296/68.1; 180/271
(58) Field of Classification Search .......... 701/45, 701/46, 49; 280/734, 748; 180/271, 273; 318/466; 296/68.1, 65.01, 65.03
See application file for complete search history.

(56) References Cited

U.S. PATENT DOCUMENTS

| | | | |
|---|---|---|---|
| 4,907,153 A | | 3/1990 | Brodsky |
| 6,195,603 B1 | * | 2/2001 | Gauger et al. ............... 701/49 |
| 6,283,886 B1 | * | 9/2001 | Schumann ................. 475/162 |
| 6,349,965 B1 | * | 2/2002 | Heilig ....................... 280/748 |

FOREIGN PATENT DOCUMENTS

| | | |
|---|---|---|
| DE | 36 33 347 C2 | 4/1988 |
| DE | 39 00 219 A1 | 7/1989 |
| DE | 41 08 295 A1 | 9/1991 |
| DE | 40 24 905 A1 | 2/1992 |
| DE | 40 34 558 A1 | 5/1992 |
| DE | 198 55 996 C1 | 12/1999 |
| DE | 198 52 541 C1 | 3/2000 |
| DE | 198 45 772 C2 | 4/2000 |
| WO | WO 00/012348 | 3/2000 |

* cited by examiner

Primary Examiner—Gertrude A. Jeanglaude
(74) Attorney, Agent, or Firm—Christie, Parker & Hale, LLP

(57) ABSTRACT

A motor seat device includes a drive device for displacing a part of the seat in a particular direction. Data for operating the drive device in reaction to a presetting process is stored in a pre-setting memory. A memory drive device controls the drive device according to this operating data. The drive device is further controlled by having a control mechanism process the operating data issued from the drive device during its inertia rotation. The drive device is elastically coupled to the displaceable part so that an at least temporarily asynchronous movement can occur between the drive device and the displaceable part. The position of the displaceable part is determined by evaluating a signal generated by a drive movement of the drive device. The torque of the drive device or a parameter correlating thereto is evaluated to correct a position error caused by the asynchronous movement.

22 Claims, 5 Drawing Sheets

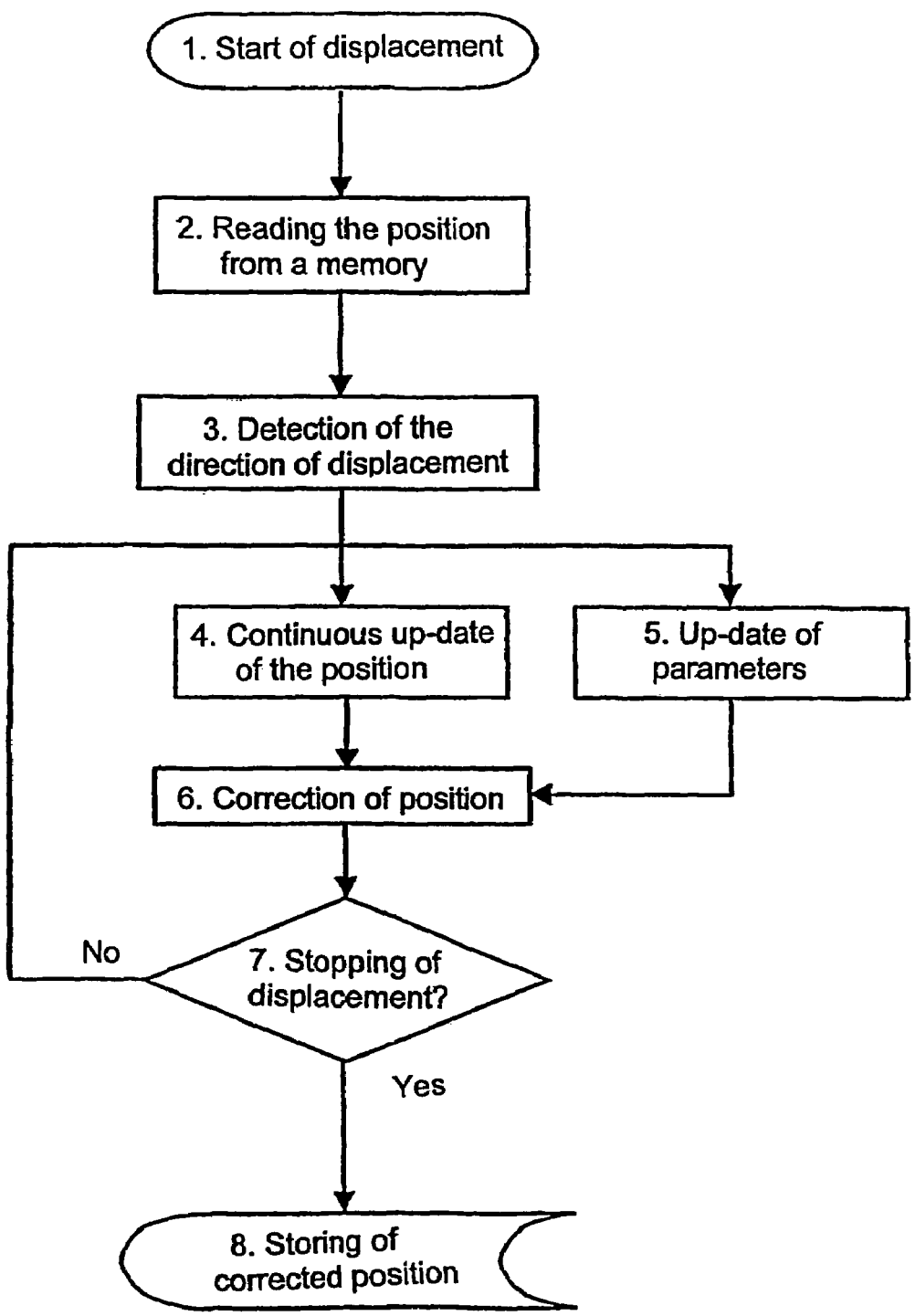

METHOD AND DEVICE FOR DETERMINING A POSITION OF A PART OF A MOTOR VEHICLE SEAT WHICH CAN BE DISPLACED BY MEANS OF A DRIVE DEVICE

CROSS-REFERENCE TO RELATED APPLICATION

This application is a National Phase Patent Application of International Application Number PCT/DE02/01683, filed on May 6, 2002, which claims priority of German Patent Application Number 101 22 586.5, filed on May 10, 2001.

FIELD OF THE INVENTION

The invention relates to a method and device for determining a position of a part of a motor vehicle seat which can be displaced by a drive device.

BACKGROUND

A motor seat device, such as the device disclosed in DE 41 08 295 A1 includes a displacement motor for displacing a motor vehicle seat in a forward or backward direction, a lift motor for moving the seat up and down and an incline motor for adjusting the angle of incline of the backrest of the seat. Data for operating the corresponding motors in reaction to a presetting process is stored in a pre-setting memory. A memory drive device drives the motors according to this operating data. By operating a manual switch device the motors are driven by a manual drive device. Controlling the motors in the event of actuation of the manual switch device when the motors are driven by the memory drive device is carried out by having a control mechanism process the operating data issued from each motor during its inertia rotation as signals in the same direction as directly before the inertia rotations of the relevant motors.

The adjusting devices of modern motor vehicle seats have self-locking displaceable elements in order to ensure the security of the vehicle seat in the event of a crash and to prevent the seat from being moved forwards by crash forces. As a result of the self-locking action of the displaceable elements, the adjusting devices of modern vehicle seats have a tendency to act sluggishly or slow. As such, the problem of errors in the start-up position through inertia rotations of the adjusting systems with the driving motors is rather less. It is questionable whether the accuracy of the determination of the actual position of the adjusting devices is adequate for approaching the stored position.

The object of the present method and device is therefore to improve the accuracy of determining the actual position of a part of a motor vehicle seat which can be displaced by a drive device without increasing the costs of sensors for detecting the position or impairing the self-locking properties of the adjusting device.

SUMMARY

Improved accuracy in determining the actual position of a part of a motor vehicle seat which can be displaced by a drive device is achieved by evaluating a signal which is generated dependent on a drive movement of the drive device. Apart from this signal at least one parameter is additionally evaluated for correcting a position error whereby the position error is caused by an at least temporarily asynchronous movement between the drive device and the displaceable part.

If the displaceable part of the motor vehicle seat is driven directly by the drive device, and therefore without any force transfer through gearing elements or coupling elements, the movement of the drive device and the displaceable part would take place synchronously. As a general rule for transferring a drive moment in particular drive torque) and drive speed in particular the speed of the drive), gearing elements and coupling elements are used which enable transmission ratios to lower speeds or to raise torques. In place of the electric motors featuring a spinning rotor usually used with motor vehicle seats, other drive devices can also be used such as linear motors or a hydraulic system with a corresponding gear means.

The driving force applied by the drive device causes elastic deformations in the gear and coupling elements. These elastic deformations lead to a deviation in the proportionality between the drive movement of the drive device and the displacement movement of the displaceable part. As a result of this deviation in proportionality, the drive device and the displaceable part are moved asynchronously respective to one another for a period until the elasticity is tensioned. This temporary asynchronicity leads to a difference between the drive movement as determined by the signal and the physical movement of the displaceable part and thus, to a position error in the actual position of the displaceable part.

In addition to the asynchronicity inherent in an elastic coupling, further sources of error are possible contributing to the position error. For instance, gear or coupling elements frequently have a significant play between the displacement directions. In the event of changing the displacement direction this play leads to a temporarily asynchronous movement between the drive device and the displaceable part. Plastic deformation of the gear or coupling elements is yet another possible source of error. A displacement system which is tensioned by movement becoming locked leads after some time to a set developing in the materials, and thus to plastic deformation of the previously elastically tensioned elements and thereby to a further form of the asynchronous movement.

In order to determine the position of the displaceable part a signal will be evaluated which is generated in dependence on a drive movement, more particularly a rotation of a drive axis of an electric motor. Different measuring processes can be used for this generation. By way of example, the signal is a voltage signal proportional to the rotational angle, current signal or frequency signal. More advantageously digital impulses characterizing a certain rotational angle or drive path are evaluated. These impulses are generated by at least one Hall sensor in which a magnet mounted on the drive shaft functions as a transmitter for the measuring system. In an alternative embodiment, it is possible to evaluate binary signals generated by the drive movement. For example, punched discs can be used to detect different rotational angles.

The signal is evaluated based on the nature of the signal and the way in which the drive movement copies computer-processable data. For purposes of evaluation, the signal is quantized by means of an analog to digital converter, or the analog signal is converted by a threshold value switch into digital pulses. In one embodiment, the computer evaluative signals are counted in a micro-computer for evaluation and are assigned to certain positions of the displaceable part. Furthermore, the signals preferably serve to determine memory positions of the displacements and to automatically correct the position for reaching the memory positions, as described in DE 41 08 295-A1.

In particular, the generation of the signals takes place within or in the vicinity of the drive device in order to save on the additional cabling that would be needed for distant sensors located in different parts of the displacement system. If the displacement movement of the displaceable part can be sensed directly, then there is the advantage of saving a connection and the problem on which the present method and device is based could be solved more easily and in a different way. As an alternative to a sensor transmitter mounted on the drive axis or on another drive element (with an associated sensor) the ripple of the motor current itself is evaluated as a signal. The ripple counting process known in the prior art can be applied with particular advantage to the correction of position errors in the present method and device given that a correction is still possible after switching off the motor current.

Essential to the invention is the evaluation of a parameter in addition to the signal already mentioned. This parameter must therefore not solely be generated from the drive movement. This parameter requires a further value independent of the signal generated from the drive movement, for example a time value of a clock or another time transmitter. The time value is used as a parameter or is evaluated in combination with the signal generated from the drive movement as a parameter which serves to determine and evaluate a speed of the displaceable part. The parameter characterizes properties of the displacement and represents at least one value affecting the displacement. Starting from the example previously mentioned, the speed of an unregulated drive device is evaluated as a measure for sluggish movements of the displacement system and thus for determining the of elastic deformation of the displacement system.

In addition to the previous embodiment, other parameters may be evaluated with advantageous results. Depending on the parameter which is to be evaluated, methods are used which are adapted to that type of parameter. Whereas the time and control values such as for example the motor current direction are already available for evaluation in computer processable form in a computer unit, other parameters to be determined such as the seated weight of the occupant or the atmospheric temperature are measured by sensors and where necessary must be converted into computer processable information. If several datum or constants are required for determination and evaluation of the parameter then the parameter is calculated by means of an algorithm or is read off from an empirically determined table. In a further embodiment of the present method and device several parameters are evaluated in combination for different influences affecting the displacement.

The correction of the position error makes it possible to compensate by computer technology the most varied influences on the asynchronicity between the drive device and the displaceable part. In addition, the correction of the position error is carried out using an algorithm, empirically determined values, or other successive processes. Particular embodiments for carrying out the correction will be explained below.

In a further embodiment of the present method and device the position error is corrected based on a class assigned to the correction. The classes are previously fixed by empirical methods for a certain accuracy of correction. Alternatively, they are optimized in an heuristic manner using several displacement stretches. Which class in a displacement process is fixed as the actual class for the correction of the position error is determined by comparing the one or more characteristic values with one or more threshold values. The decisive values for correction of the class in this correction case are subsequently measured, calculated and/or retrieved from a memory.

In a further development of the present method and device, each class is assigned a correction factor for the correction of the position error. For example, a positive or a negative sign may serve as correction factors. If in this example the control signal is used as parameter for supplying current to the drive device, for the class "negative" which is valid after current is supplied, the incoming signals for movement of the drive unit are negatively weighted with the correction factor "−1". As a result of the relaxation of the elasticity the drive axis is moved contra to the displacement and at the start of displacement for tensioning, the elasticity the same absolute position error arises. Thus in this illustrated correction process, data of the signal are divided for evaluation into additive data and subtractive data. Consequently the actual position is corrected in the displacement direction corresponding to the additive data or opposite the displacement direction corresponding to subtractive data. As an alternative, the correction factor may be a proportionality factor. If the class is determined as a parameter through a torque on the drive device then in a region of the tensioning of the elasticity, the position error is proportional to the torque of the drive device. This proportional part of the position error is corrected using the correction factor after switching off the motor current.

In a further advantageous development of the present method and device, each class is assigned a correction constant for correcting the position error. In this manner the position error is corrected particularly simply without additional required computer power by retrieving the correction constant from a non-volatile memory. For this purpose, correction constants are previously determined empirically and recorded in the memory for the corresponding displacement system. The correction constant may be combined with other factors, for example the correction factor or potency factor of an algorithm, in order to correct the position error.

Apart from correction factors and correction constants, further functional connections such as square functions or root functions are possible. Functional connections are used for correction with particular advantage in order to weight the signal based on the parameter. The weighting is thereby not restricted to a class division. It evaluates the signal alternatively by using constant functions.

In a development for weighting of the present method and device signal data is divided into data to be evaluated and data dropped for correction. This enables a particularly rapid correction and updating of the position corresponding to the data which is to be evaluated. By way of example, the position error is continuously determined in relation to the torque of the drive device. If the torque of the drive device rises as a result of a sluggishness in displacement then the elasticity of an elastic coupling is accordingly being tensioned more severely. According to the torque the data of the signal is distributed differently for weighting; a greater proportion of dropped data is allocated for correction of the greater sluggishness.

In a particularly advantageous development of the present method and device, as signal pulses generated in dependence on the drive movement are evaluated, for instance a rotational angle of the drive movement, the pulses are counted for evaluation and added or subtracted according to the displacement direction. The counting of the pulses is corrected.

Various values are evaluated as parameters. Parameters evaluated include drive values such as a control signal for supplying current to the drive device corresponding to the displacement direction, a scanning ratio of a pulse width modulation for regulating the drive speed, a voltage of the vehicle battery, a displacement time or the number of pulses of the signal within one time unit, the time interval between two pulses, a temperature of the drive device or of the displacement system, and motor power or a measured or calculated torque of the drive device. The parameter is preferably determined cyclically and continuously updated in a memory. Sliding mean values can also be formed for updating. Some parameters are alternatively determined only shortly before switching off the motor current and subsequently included in the calculation.

Likewise an operating value may be used additionally as a parameter. The operating value is thereby dependent on external operating influences on the displacement. The operating values such as seat occupancy, a seated weight of the seat user, a distribution of the seated weight or an atmospheric temperature are detected and evaluated for correction. By way of example the seated weight of the seat user is an important value which influences the sluggishness of the displacement. Determining the seated weight can thereby take place at an early stage, more particularly after the seat user gets in and closes the vehicle door.

The sluggishness of the displacement system may be additionally determined over the entire possible displacement path and stored in a memory. From known sluggish actions a correction is possible for the corresponding displacement region by evaluating stored data of the displacement system as a parameter corresponding to the positions for the sluggish actions.

In order to adapt to the evaluation of changed conditions in the displacement system (for example the contamination of displacement elements and gear elements) at least one significant characteristic of the displacement is evaluated as the parameter. This significant characteristic may be for example the detection of the elasticity for blocking the displaceable part. Possible significant sluggish action, smooth running action or a known play of the displacement system are detected inter alia as characteristic.

In one embodiment, a combination of one or more operating values, one or more drive values, stored sluggish actions and/or one or more significant characteristics are evaluated as characteristic of the displacement. An x-dimensional class matrix is used for correction whereby x indicates the number of parameters which are to be evaluated combined. Thus for correction, one class of a class matrix is determined from the temperature of the drive device, the momentary torque of the drive device, the change in the drive torque and the seated weight, as well as the distribution of the seated weight.

In another embodiment of the present method and device the drive movement is determined by means of a single-channel sensor. The single-channel sensor, for example a Hall sensor, requires only two additional cables to be laid without having to integrate an evaluation electronics unit in the sensor. The signal as evaluated is a non-direction detectable sensor signal of the single-channel sensor. Since the direction cannot be determined by a single Hall sensor a characteristic value, for example the control signal for the direction of the current supply to the drive device, is evaluated as well. When using a single Hall system the sensor unit is not in a position without evaluating an additional parameter to differentiate the direction of rotation of the drive axis since the generated pulses are independent of the direction of rotation.

Through the present method an increase is achieved in the position repetition accuracy of the displacement system, more particularly with a single Hall sensor unit, without having to use the more complex and thus more cost-intensive Hall elements, e.g. double Hall systems. An increase in the position repetition accuracy in turn reduces the likelihood that the displacement system is moved into a block and thus into an end stop. Since moving into a block causes a high strain on the electric motors and gearing the wear on the electric motors and gear can thus be notably reduced. If nevertheless blocking occurs, then the position determination at this point is standardized anew. Furthermore the use of single Hall systems reduces the cabling costs for the drive devices since no direction information has to be transmitted.

In a further embodiment of the present method and device the parameter is evaluated in a double function for correcting a position error and for detecting a jamming of an object or part of a human body. If several parameters are evaluated then it is possible to detect a jamming case from the seated weight, the anticipated sluggish action of the displacement system and from the actual sluggish action of the displacement system.

BRIEF DESCRIPTION OF THE DRAWINGS

FIG. 4' shows a diagrammatic detail of the development of the correcting process from FIG. 4; and FIG. 5 shows a further diagrammatic development of the correcting process.

DETAILED DESCRIPTION

Figure 1:
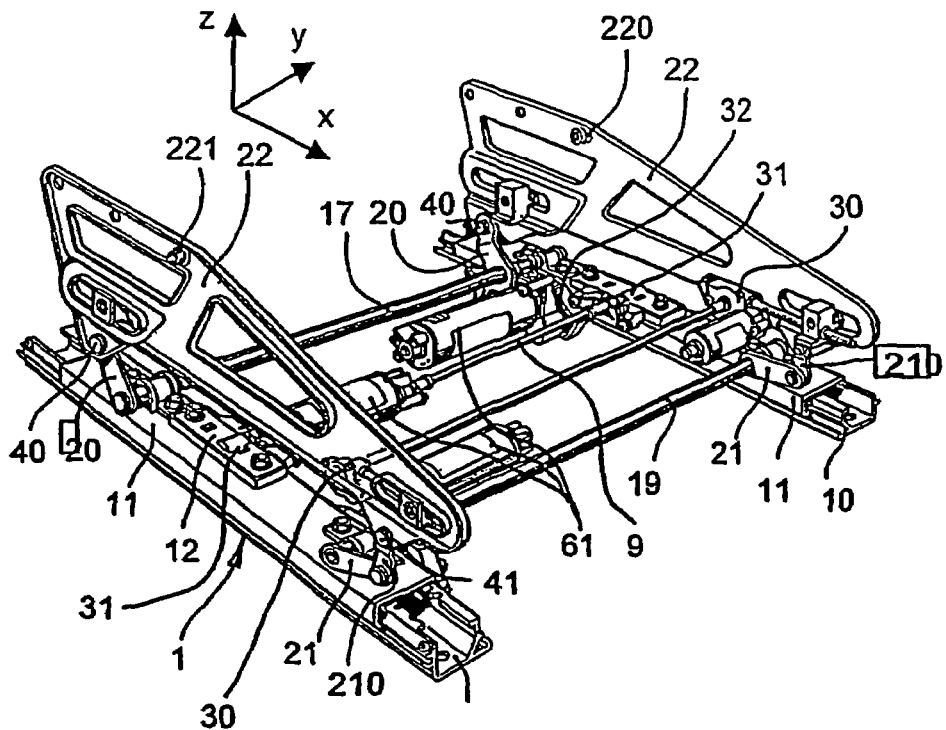
FIG. 1 shows a perspective view of a seat frame with a number of motor driven displacement paths.

FIG. 1 shows a seat lower frame having a number of motor driven displacement paths. The seat lower frame includes a pair of rail guides 1, the lower guide rails 10 of which can be fixed on a vehicle floor and the upper guide rails 11 of which support the seat structure and drive assemblies. An electric longitudinal displacement device of the seat lower frame include gears 31 which are driven directly by the motor 61 or indirectly through a flexible shaft 9.

The rear seat height (not shown) is adjusted by the motor 61 through gear 32. The adjustment force is transferred to the connecting shaft 17 which is connected in rotationally secured fashion at its ends to the drive levers 20. The ends of the drive levers 20 engage through pivotal bearings 40 the rear ends of the side plates 22 so that a swivel movement of the lever 20 leads to an up and down movement of the rear side plate 22. The gear 30 thereby serves only to adjust the seat depth and has but a slight influence on the crash security of the seat. The front seat height (not shown) is adjusted in an analogous way using a further motor through another gearing and a further connecting shaft through the lever arms 21 and 210.

Both belt mounting points 220 and 221 of the seat frame are mounted on the side parts or plates 22. In the event of a crash, the crash force is introduced through the belt mounting points 220 and 221 into the seat frame leading to the desired and undesired deformations of parts or structural groups, for example stretching and bending of an angled contour resulting in forward displacement of the seat in the load direction.

In order to prevent forward displacement of the seat, the gears and associated displacement elements such as the spindles, etc. are designed to be self-locking. By way of illustration, FIG. 1 shows a co-ordinate cross whereby the x-direction points in the drive direction, the y-direction points across the drive direction and the z-direction points upwards, perpendicular to the xy plane. The gears 30, 31, 32 and 33 as well as the flexible shaft 9 are elastically deformed by displacement until the displacement force engaging on the displacement is greater than the self locking action or the friction force of the sluggish action of the displacement system.

Figure 2:
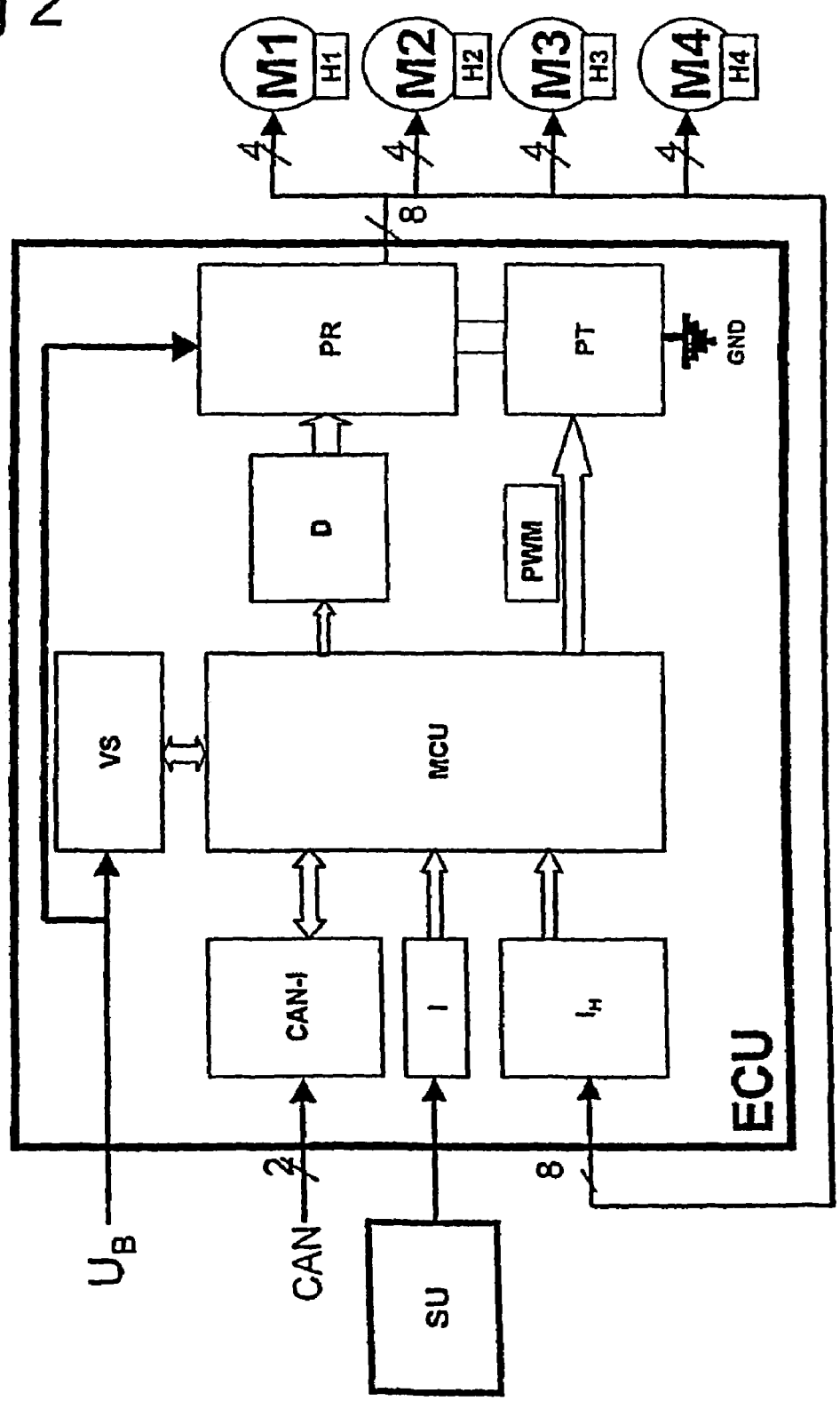
FIG. 2 shows an evaluation device and four motors each with a Hall sensor.

FIG. 2 shows an evaluation device ECU and four motors M1 to M4 each with a Hall sensor H1 to H4. A unit comprising the electric motor M1 and Hall sensor H1 is connected to the evaluation device ECU through a connection lead 4. Analogous units comprising M2 paired with H2, M3 paired with H3, and M4 paired with H4 are similarly connected to the evaluation device ECU through connection leads 4. Two of these leads 4 are connected for transferring the motor current to the power relay PR of the evaluation device ECU. The other two leads are connected to the interface $I_H$ (evaluation circuit) for the Hall sensors H1 to H4 of the evaluation device ECU. The signals of the Hall sensors H1 to H4 are converted in the interface $I_H$ into computer-processable pulses and forwarded to the micro computer unit MCU of the evaluation device ECU.

The micro computer unit MCU controls the power relays PR through a driver D. The micro computer unit MCU additionally generates a pulse width modulated control signal PWM for controlling the power transistors PT. The power transistors PT serve to control the relevant motor current and are connected to the power relays. In order to feed in and store parameters of the system in the micro computer unit MCU, the micro computer unit MCU has an integrated flash memory. The micro computer unit MCU is connected to a voltage supply VS with the voltage $U_B$ of the vehicle battery which supplies the micro computer unit with the operating voltage of, as a rule, 5 V. In addition the voltage supply VS has a watchdog for booting up the evaluation device EGU from standby mode.

Furthermore, the micro computer unit MCU is connected to an input interface I which forms an interface to an operating device SU, specifically a switch block SU for controlling the electric motors M1 to M4. A further interface CAN-I connects the micro computer unit MCU to a CAN bus which enables information and data exchange with further function units of the vehicle.

Figure 3:
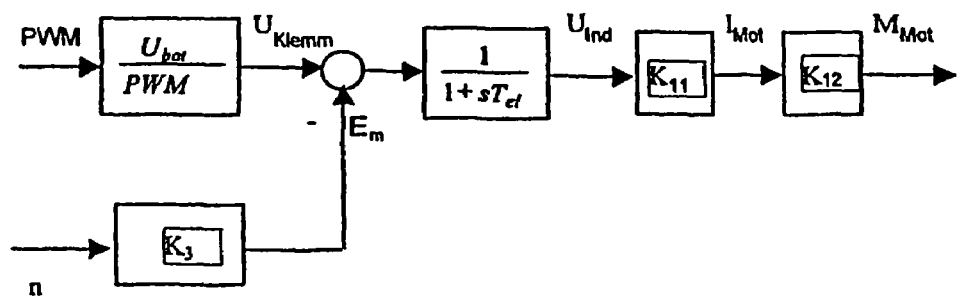
FIG. 3 shows a model for calculating the torque supplied by the electric motor.

FIG. 3 shows a model for calculating the torque $M_{Mot}$ discharged by the electric motors M1 to M4 as a parameter. The terminal voltage $U_{Klemm}$ adjoining the terminals of the electric motors M1 to M4 is calculated from the battery voltage $U_{bat}$ and the scanning ratio of the pulse width modulation PWM. The terminal voltage $U_{Klemm}$ is counteracted by the voltage $E_m$ dependent on the speed n of the electric motor M1, M2, M3 or M4 through the factor $K_3$. The counter induction voltage $U_{Ind}$ of the electric motor M1, M2, M3 or M4 is calculated in dependence on the low-pass behavior of the electric motors M1, M2, M3 or M4. The motor current $I_{mot}$ is calculated through a factor $K_{11}$. The torque of the electric motor M1, M2, M3 or M4 is calculated through a further factor $K_{12}$. Accordingly the torque of the motor M1, M2, M3 or M4 is determined in the micro computer unit MCU using the following formula:

$$M_{Motor} = (U_{Klemm} - K_3 * n)\left(\frac{1}{1 + sT_{el}}\right) * K_{11} * K_{12}$$

Figure 4:
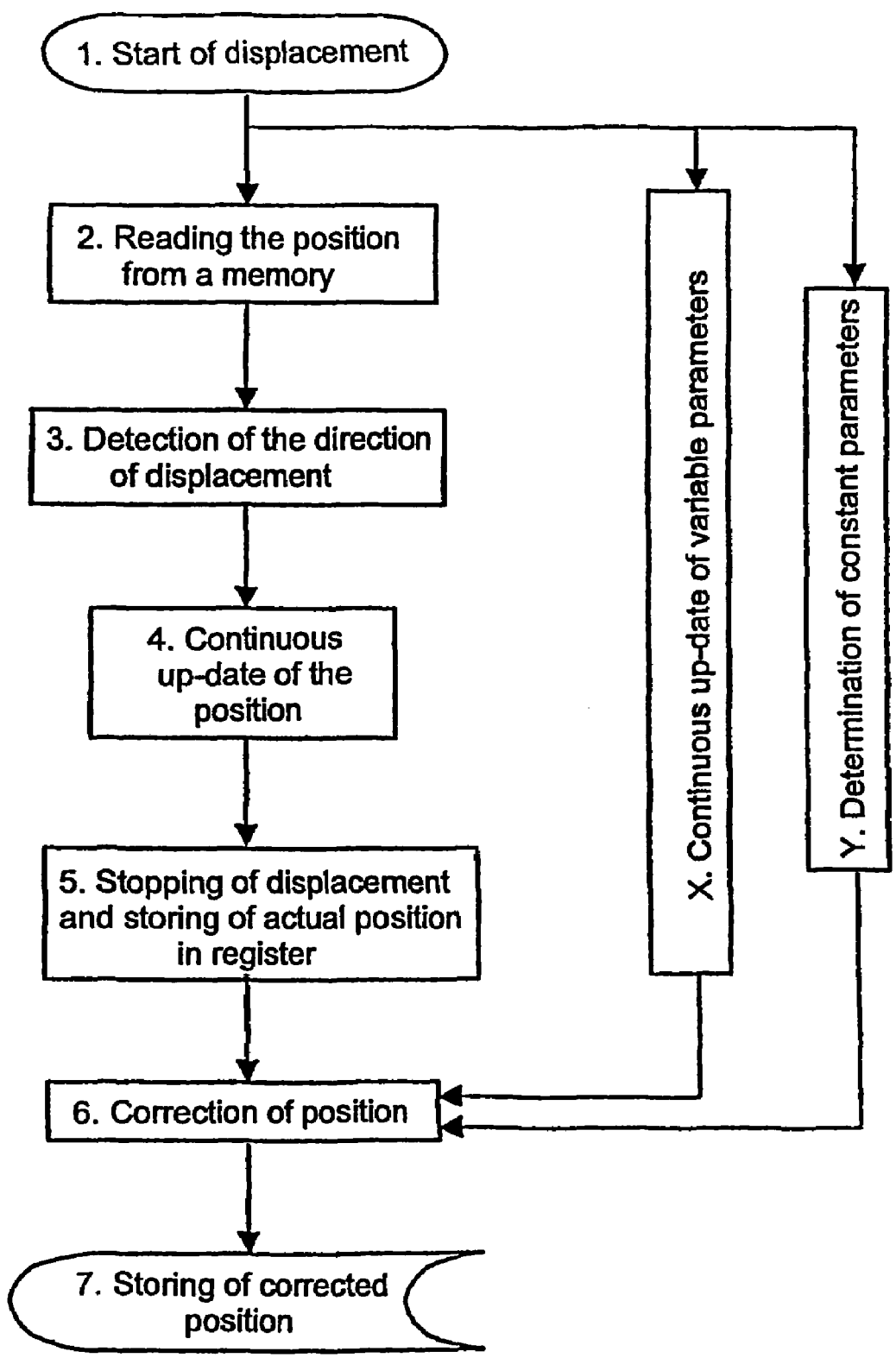
FIG. 4 shows a diagrammatic development of a correcting process.
Figure 4:
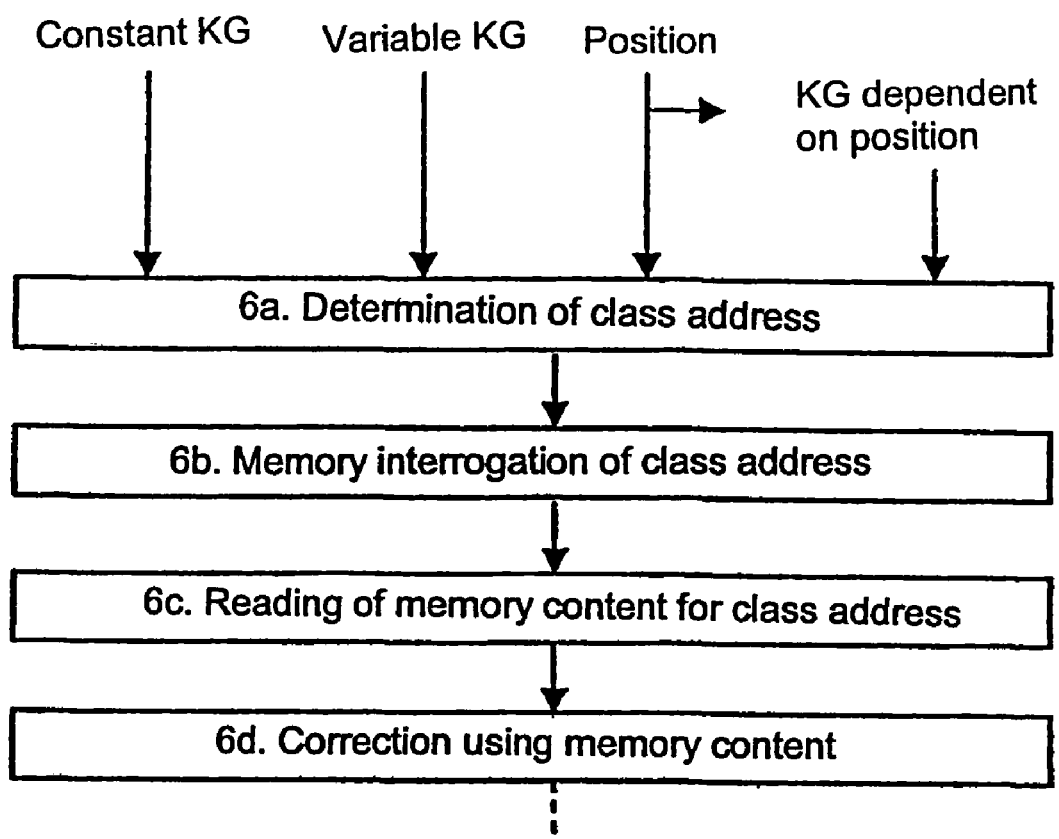

FIG. 4 shows diagrammatically a development of a correcting process. In step 1 the displacement is started by the user pressing a button of the operating device in order to move the seat into another position. The electric motor M1, M2, M3 or M4 is supplied with current from the evaluation device ECU.

In step 2 the previous stationary position is retrieved from a memory and loaded into a register of the micro computer unit MCU before the start of the rotational movement of the electric motor M1, M2, M3 or M4. In step 3 the displacement direction is determined from a control value of the micro computer unit. The control value can also be evaluated for later correction as a parameter.

The position of the displacement is continuously updated using the generated pulses of the Hall sensor H1, H2, H3 or H4 by adding or subtracting the generated pulses from an actual value corresponding to the direction of displacement. Each automatically adjustable position thereby corresponds to a numerical value. If the adjustment is stopped by a user letting go of the button or by the displacement reaching an automatically adjustable position stored for this purpose, the actual position is stored in the interim in a register of the micro computer unit MCU.

During steps 2 through 5, variable parameters including time-variable parameters and parameters dependent on the displacement movement are continuously updated in process X. In process Y, time-invariable parameters are also determined and stored in a memory in the interim, for example in a RAM. In step 6 the position stored in the interim in the register of the micro computer unit MCU is corrected based on these parameters. The corrected position is recorded in a following step 7 in a non-volatile memory. For a further adjustment this corrected position is retrieved in turn from the non-volatile memory in a step 4' (not shown in FIG. 4).

Step 6 of FIG. 4 is shown in detail in FIG. 4'. In FIG. 4', one or more class addresses are determined from the following parameters; the constant parameters KG, the variable parameters KG, the position, and the parameters KG in step 6a dependent on that position. Each possible class address is in turn assigned a constant memory content or one dependent on further conditions, for example the seat adjustment. The memory content thereby depicts the position error through the at least temporarily asynchronous movement. The error is identical to the memory content or is a transformed value of the memory content which is calculated in a later algorithm in the micro computer unit MCU. Accordingly, in step 6b the memory is interrogated for the corresponding class address and in step 6c the memory content is read for the class address. Finally in step 6d, the correction of the position takes place using the memory content, and the incoming signals of the Hall sensors H1, H2, H3 and H4 are weighted accordingly.

FIG. 5 shows an alternative method for correcting the position error. The steps 1 to 3 of FIG. 5 correspond to steps 1 to 3 of FIG. 4. In step 4 of FIG. 5 the position is updated by some numerical values. At the same time in step 5 the parameters are updated. Then in step 6 the position value is corrected in real time for example, using the detected torque requirement of the electric motors M1 to M4. If in step 7 displacement continues then steps 4 and 5 are repeated and the position and parameters are updated again based on the previously corrected position. If the displacement is stopped in step 7 then the storing of the last corrected position takes place in step 8.

The invention claimed is:

1. A method for determining a position of a part of a motor vehicle seat which is displaceable by an electric drive device elastically coupled to the displaceable part so that an at least temporarily asynchronous movement occurs between the electric drive device and the displaceable part, the method comprising:
   determining the position of the displaceable part by evaluating a signal generated in dependence on a drive movement of the electric drive device;
   evaluating a parameter comprising at least one of the torque of the drive device and at least one parameter of the electric drive device correlating with the torque;
   using the evaluated parameter to correct a position error caused by the asynchronous movement between the electric drive device and the displaceable part.

2. The method of claim 1, wherein the parameter of the electric drive device correlating with the torque comprises at least one of a drive voltage, a drive current and a speed.

3. The method of claims 1 or 2, wherein the position error is corrected in dependence on a class assigned to the correction; and
   wherein the class assigned to the correction case is determined by comparing at least one of the torque of the drive device and a parameter of the drive device correlating with the torque with one or more threshold values.

4. The method of claim 3, wherein each class is assigned a correction factor for correcting the position error.

5. The method of claim 3, wherein each class is assigned a correction constant for correcting the position error.

6. The method of claim 1, wherein for correction, the signal is weighted in dependence on at least one of the torque of the drive device and a parameter of the drive device correlating with the torque.

7. The method of claim 6, wherein data from the signals is divided for weighting into additive data and subtractive data; and
   wherein the actual position is corrected in the displacement direction and opposite the displacement direction for additive data and subtractive data respectively.

8. The method of claim 6 or 7, wherein from the signals is divided for weighting into data to be evaluated or data dropped for correction, and the position is updated correspondingly to the data to be evaluated.

9. The method of claim 6, wherein signal pulses generated in dependence on the drive movement are evaluated;
   wherein for evaluation the pulses are counted and added or subtracted according to the displacement direction; and
   wherein the counting of the pulses is corrected.

10. The method of claim 7 or 9, wherein for correction the pulses are added to the position when the drive device is supplied with current as a result of a control signal used as a parameter for the displacement direction;
    wherein the pulses are subtracted from the position when the supply of current to the drive device for the displacement direction is terminated;
    wherein the pulses are subtracted from the position when the drive device is supplied with current as a result of a control signal of characteristic value for the counter displacement direction; and
    wherein the pulses of the position are added when the supply of current to the drive device for the counter displacement direction is terminated.

11. The method of claim 1, wherein the parameter evaluated is a drive parameter.

12. The method of claim 1, wherein the parameter evaluated is an operating parameter.

13. The method of claim 1, wherein the parameter evaluated comprises the stored sluggish actions of the displacement system.

14. The method of claim 1, wherein the parameter evaluated comprises at least one significant characteristic of the displacement.

15. The method of claim 7, wherein the parameter evaluated comprises a combination of one or more operating values, one or more drive values, stored sluggish actions and one of more significant characteristics.

16. The method of claim 1, wherein the drive movement is determined by a single-channel non direction detectable sensor.

17. The method of claim 1, wherein the parameter comprising the torque of the drive device or at least one parameter of the drive device correlating with the torque is evaluated in a double function for correcting a position error and for detecting a jamming of an object or part of a human body.

18. A device for determining a position of a part of a motor vehicle seat which can be displaced by an electric drive device elastically coupled to the displaceable part so that an asynchronous movement can occur at lest temporarily between the electric drive device and the displaceable part, the device comprising:
    an evaluation device for determining the position of a displaceable part by evaluating a signal generated in dependence on a drive movement of the electric drive device, and wherein the evaluation device evaluates additionally a parameter comprising at least one of the torque and a parameter of the electric drive device correlating with the torque, for correcting a position error caused by an asynchronous movement between the electric drive device and the displaceable part; and
    a position error correcting device correcting a position error determined from the evaluation of a parameter comprising at least one of the torque of the drive device and a parameter of the drive device correlating with the torque.

19. The device of claim 18, wherein the parameter of the electric drive device correlating with the torque comprises at least one of a drive voltage, a drive current and a speed.

20. The method of claim 9, wherein the signal pulses evaluated are generated in dependence on a rotational angle of the drive movement.

21. The method of claim 11, wherein the parameter evaluated is a drive parameter selected from the group consisting of a control signal for the displacement direction, a scanning ratio of a pulse width modulation, a battery voltage, a displacement time, a drive temperature, a measured or calculated torque, or a combination of several of the preceding drive parameters.

22. The method of claim 12, wherein the parameter evaluated is an operating parameter selected from the group consisting of a seat occupancy, a seated weight of a seat user, a distribution of the seated weight, an atmospheric temperature, or a combination of several of the preceding operating parameters of the seat or of one or more operating parameters with one or more drive para meters.

* * * * *

UNITED STATES PATENT AND TRADEMARK OFFICE
CERTIFICATE OF CORRECTION

PATENT NO. : 7,099,761 B2  
APPLICATION NO. : 10/477011  
DATED : August 29, 2006  
INVENTOR(S) : Woller et al.

It is certified that error appears in the above-identified patent and that said Letters Patent is hereby corrected as shown below:

On the Title Page

| | |
|---|---|
| (73) Assignee: | Delete "GmnH", Insert --GmbH-- |
| Column 9, line 16, Claim 1 | After "the torque;", Insert --and-- |
| Column 9, line 45, Claim 8 | Delete "wherein from", Insert --wherein data from-- |
| Column 10, line 27, Claim 18 | Delete "lest", Insert --least-- |
| Column 10, line 63, Claim 22 | Delete "para meters", Insert --parameters-- |

Signed and Sealed this

Seventeenth Day of April, 2007

JON W. DUDAS  
*Director of the United States Patent and Trademark Office*